United States Patent
Jacob et al.

(10) Patent No.: US 6,434,461 B1
(45) Date of Patent: Aug. 13, 2002

(54) AIRBAG SENSOR SYSTEM

(75) Inventors: Lutz Jacob, Elchingen; Georg Weiss, Kipfenberg, both of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/601,009

(22) PCT Filed: Jan. 27, 1999

(86) PCT No.: PCT/DE99/00191

§ 371 (c)(1),
(2), (4) Date: Jul. 25, 2000

(87) PCT Pub. No.: WO99/38730

PCT Pub. Date: Aug. 5, 1999

(30) Foreign Application Priority Data

Jan. 28, 1998 (DE) .......................................... 198 03 068

(51) Int. Cl.⁷ .............................................. B60R 21/32
(52) U.S. Cl. .......................... 701/45; 280/735; 180/274
(58) Field of Search ............................... 701/45, 46, 47; 340/436, 438, 903; 307/10.1; 280/734, 735; 180/274, 282; 342/70, 72

(56) References Cited

U.S. PATENT DOCUMENTS

| | | | | |
|---|---|---|---|---|
| 3,893,114 A | * | 7/1975 | Yamanaka et al. ............ 342/72 |
| 5,826,216 A | * | 10/1998 | Lyons et al. .................. 342/70 |
| 5,835,007 A | * | 11/1998 | Kosiak ....................... 340/436 |
| 5,861,836 A | * | 1/1999 | Höss ........................... 342/70 |
| 5,872,536 A | * | 2/1999 | Lyons et al. .................. 342/70 |
| 5,936,549 A | * | 8/1999 | Tsuchiya ...................... 340/903 |
| 6,031,484 A | * | 2/2000 | Bullinger et al. ............. 701/45 |
| 6,087,928 A | * | 7/2000 | Kleinberg et al. .......... 340/436 |
| 6,209,909 B1 | * | 4/2001 | Breed ........................ 280/735 |

FOREIGN PATENT DOCUMENTS

| DE | 195 46 715 A | 6/1997 |
|---|---|---|
| EP | 728 624 A | 8/1996 |
| WO | WO 98/26308 | 6/1998 |

* cited by examiner

*Primary Examiner*—Gary Chin
(74) *Attorney, Agent, or Firm*—Pendorf & Cutliff

(57) ABSTRACT

The aim of the invention is to generate a timely triggering signal for an effective unfolding of an airbag and, at the same time, to take the relative velocity of the collision opponent into account as a triggering criterion. To this end, the invention provides that two interspaced sensors, which emit millimeter waves, are integrated in each vehicle body door. The measuring signals of said sensors are generated by means of a multi-frequency modulation method. The invention also provides that during a signal processing operation using radar technology, the obtained measuring signals are turned into velocity values (Vn) and distance values (R) according to individual echo centers of the collision object. In addition, the transversal velocity ($V_q$) with regard to the door surface is detected from said values in a series-connected situation analysis module. A classification of the collision object results from the measured values and a criterion is obtained from a subtraction of both sensor measurement outcomes. The invention can be used for triggering a side airbag in a motor vehicle.

4 Claims, 5 Drawing Sheets

AIRBAG SENSOR SYSTEM

BACKGROUND OF THE INVENTION

1. Field of the Invention

The invention concerns an airbag sensor system for actuating an airbag in a vehicle. The invention is suitable for use in both a side airbag system as well as in an alternative version adapted for use with a frontal airbag system.

2. Description of the Invention

Known airbag actuation systems employ acceleration switches or resistive films as actuators. The acceleration switches and also the resistive films respond to a collision with an external foreign body only after deformation of the automobile's body has started. Because of the small crumple zone in the area of the door, and in the front area in certain vehicle types, a timely actuation of the airbags is of great importance for the safety of the occupants. It is also advantageous to take the relative speed of the colliding bodies into consideration as actuation criteria, since the actuation can thereby be suppressed in the event of an expected quasi-static deformation of the body. In the case of acceleration switches or resistance strips, a determination of the relative speed of the approaching colliding body is not possible.

The response time of the known airbag actuation systems is too long. The switches only respond after the deformation has been started. The switches and subsequent electronics of known systems require approximately 5 ms to generate a triggering impulse, within the total time of 20 ms that is available for deployment of the airbag in the case of a collision.

SUMMARY OF THE INVENTION

The invention is based on the task of generating a timely triggering time point for an effective airbag unfolding and therein to take into consideration the relative speed of the collision opponent as a triggering criteria.

The invention advantageously utilizes millimeter wave sensors to detect the relative speed of an object entering the vicinity of the motor vehicle. Besides this, the millimeter wave measuring results can be used to classify the colliding object according to size and shape and thus classify the object as to certain vehicle types or other objects such as for example poles, stones, etc. Using this classification system, the lack of knowledge of the mass of the collision object can be compensated for and therewith the actuation analysis can be improved with respect to the danger potential. An advantage of the use of millimeter wave sensors over the use of optical sensors is that no optical windows are required in the vehicle body and accordingly the sensors are not sensitive to dirt.

BRIEF DESCRIPTION OF THE DRAWINGS

An embodiment of the invention is described in greater detail on the basis of the drawing.

DETAILED DESCRIPTION OF THE INVENTION

Figure 1A:
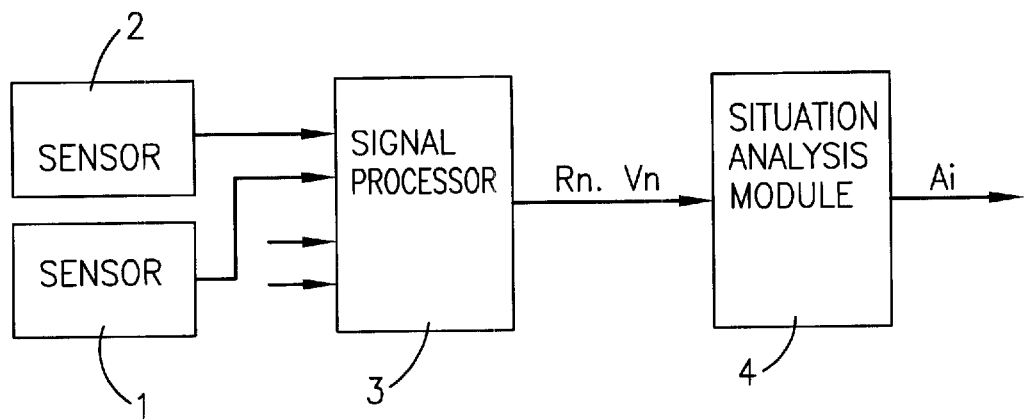
FIGS. 1a and 1b show the basic sensor configuration for a vehicle side.

The basic sensor configuration for a vehicle door/side is shown in FIG. 1a. The configuration of each of the vehicle sides includes two high frequency front ends. In FIG. 1a only two of these front ends are represented, which are referred to in the following description as sensor 1 and sensor 2. The sensors of the second side are indicated only with their signal arrows on the signal pre-processor 3 that is common to all sensors. Each of the sensors 1 and 2 has the ability of measuring close-in radar-objects with high resolution through the application of a known "two-frequency process." The signal pre-processor 3 ascertains, from the sensor signals, the distance value Rn and the velocity value Vn of the echo centers 6 of the collision objects entering into the vicinity of the sensors.

Figure 1B:
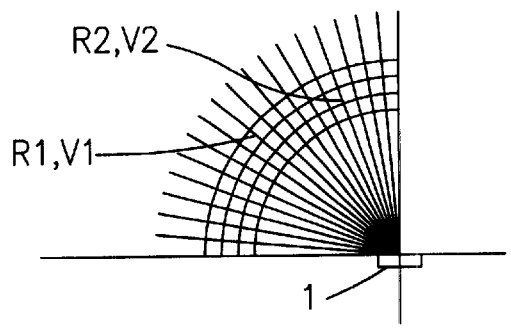

FIG. 1b clarifies the therefrom-resulting spatial analysis with equidistant spacing and velocity zones. The equidistant distance zones result as concentric, small arc segments about the center point of the sensor 1 which are adjacent to each another and the equidistant velocity zones result as segments which radiate outward from the sensor center point and are adjacent to each other. For example two detected echo centers of a collision object are represented with their value pairs R1, V1 and R2, V2.

The situation analysis module 4 generates an actuation impulse Ai on the basis of the above-described velocity analysis and also from the object classification as determined in the module by means of feature construction from the sensor measurements. Further, in the situation analysis module 4 the measured values are analyzed to determine whether the situation is a collision situation or a non-dangerous, parallel passage situation.

The velocity of a radar target is determined by measuring the Doppler frequency. The determination of the distance to a radar target is achieved by a special modulation type of the sensors. Since a high distance resolution (<10 cm) is required for an airbag sensor system, no time delay processes are used for the modulation, such as frequency modulation with linear, sinusoid or various modulation wave forms, or pulse processes, because these are carried out with the required resolution phase measurements by, for example, means of two-frequency processes (or even multi-frequency processes) or by means of amplitude-modulation. These phase measurement methods are, however, principally only utilizable for signal target situations. A complex collision object comprised of multiple echo centers must thus be resolved with radar technology.

Figure 2:
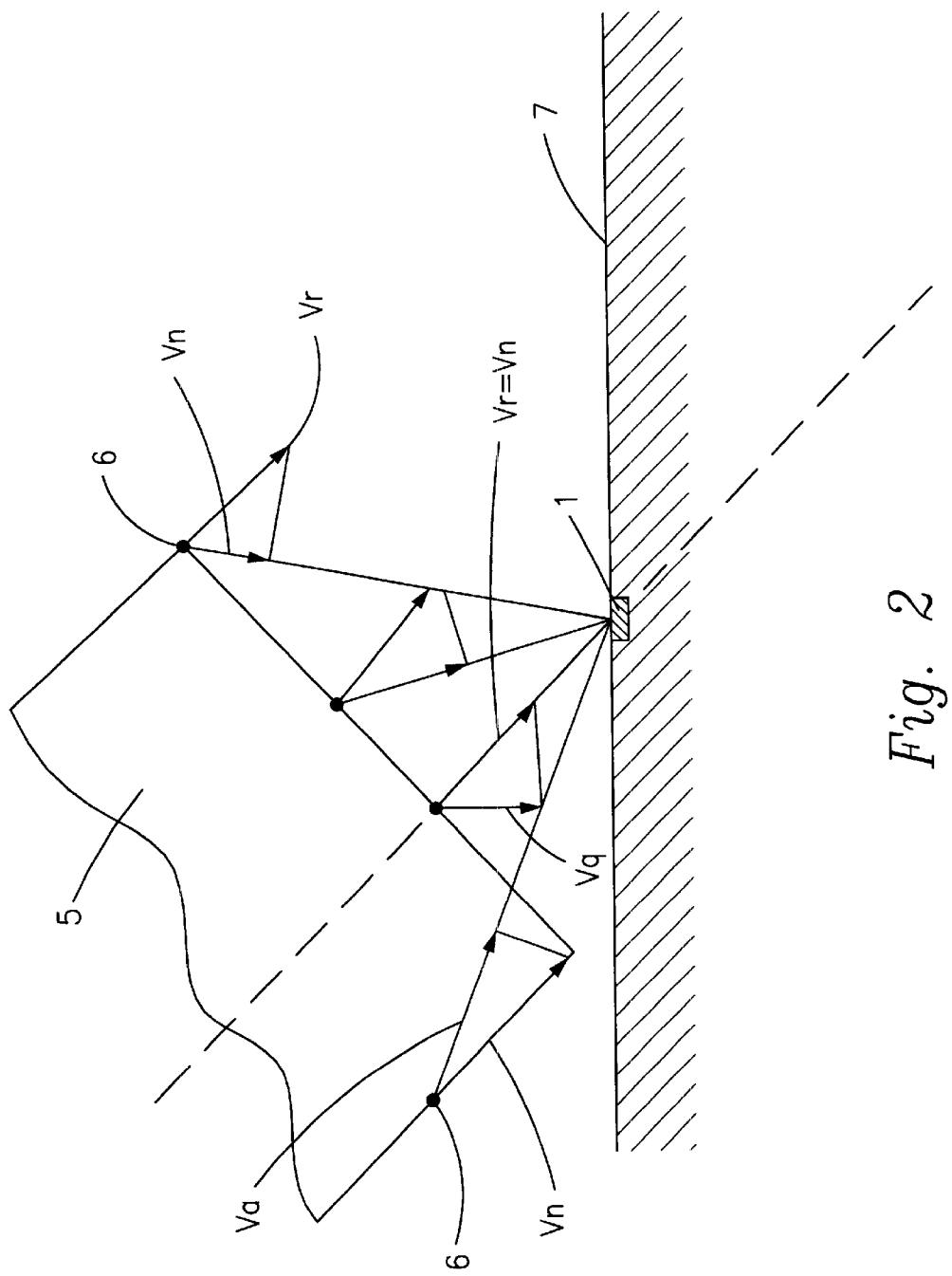
FIG. 2 shows the radar technology based resolution of the collision object.

FIG. 2 shows such a resolution, using radar technology, of a collision object 5 which approaches a sensor 1. The sensor 1 resolves the collision object into individual echo centers 5 and determines the various distance values Rn and velocity Vn, with which the individual echo centers approach the sensor 1. The line of the maximum Doppler frequency is shown as a dashed line. On this line, the velocity value Vn corresponds to the size and direction of the relative speed Vr. From the determinable direction and size of the relative velocity Vr a transverse speed Vq can be calculated, with which the collision object 5 is approaching perpendicularly to the door outer surface 7.

Figure 3:
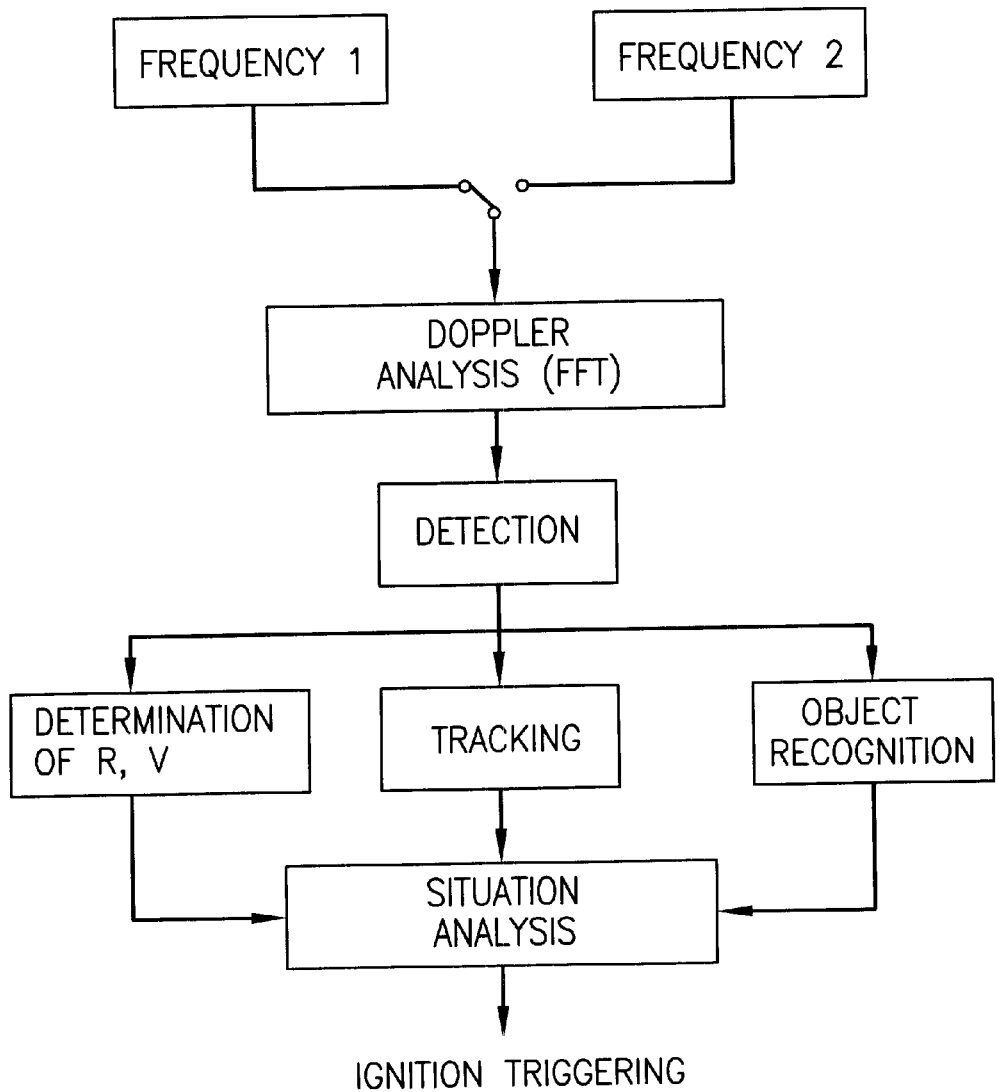
FIG. 3 shows the process for extraction of the object classification.

The process for extracting the object classification is explained by reference to FIG. 3. This illustrative embodiment is presumed to have a high frequency front end in the millimeter wave range of 76 GHz, which is operated between the transmission frequencies —frequency 1 and frequency 2—switched or simultaneously at these frequencies. This process is known under the concept of "two-frequency processes". The phases of the Doppler signals resulting from the two transmission frequencies are, within an unambiguous region, a direct measurement for the distance of the collision object 5 from the sensor. For a selected frequency separation of 50 MHz between frequency 1 and frequency 2 this unambiguous region is 3 m. Since a multiple reflection environment exists, the individual echo centers 6 must be separated from each other using a Doppler analysis in an FFT-Doppler filter bank. With an analysis time of, for example, 1 ms, a velocity resolution of 2.4 m/s results.

For the subsequent detection, the amounts of the Doppler spectrum are examined for contrasting conditions exceeding a threshold value. The distance values Rn are determined from the relative phase of the FFT-output signals.

The relative echo centers 6 are tracked in Rn and Vn over time. With this tracking, the impact of the collision object 5 upon the door can be determined. Characteristics are extracted from the FFT-data over multiple evaluation cycles for the task of object recognition. A recognition system carries out the object classification on the basis of these characteristics.

A subsequent situation analysis generates, in the case of an appropriate size of the collision object 5 and of exceeding a threshold value of the cross speed $V_q$, an actuation impulse Ai for the triggering of the airbag release upon a predetermined relation of cross section velocity $V_q$ and size of the collision object 5.

In order to be able to distinguish between the normal situation of a parallel passing of a collision object 5 and a threatening crash-situation, it is necessary to provide at least two sensors 1 and 2 spaced apart from each other in one door. The spacing must be several decimeters. For the velocity values Vn and the distance values Rn obtained at the same time from the respective sensors 1 and 2, a difference formulation between the values of the two sensors will be drawn upon for the generation of the actuation impulse Ai. The sensors 1 and 2 for obtaining the information are placed in the door internal space with antennas that have a large half-power width, for example >60°.

Figure 4A:
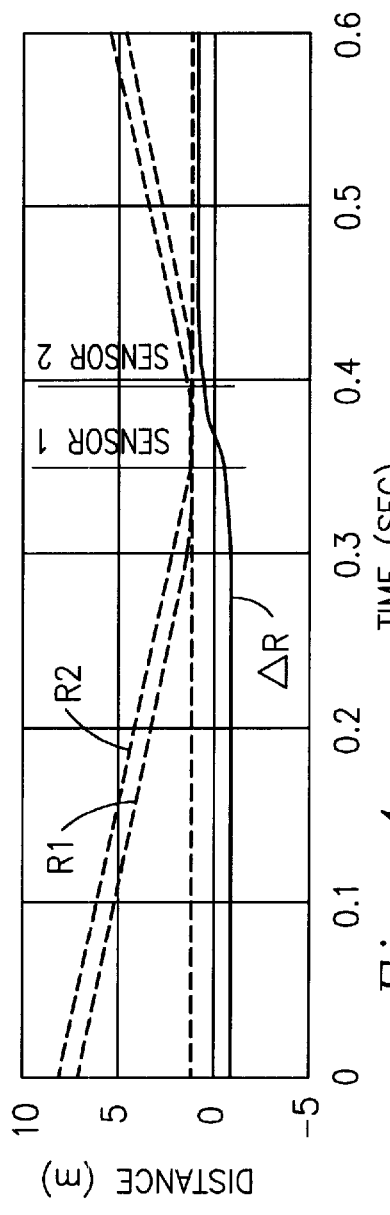
FIGS. 4a and 4b show the sensor signal and the actuation signal in the case of parallel passage.
Figure 4B:
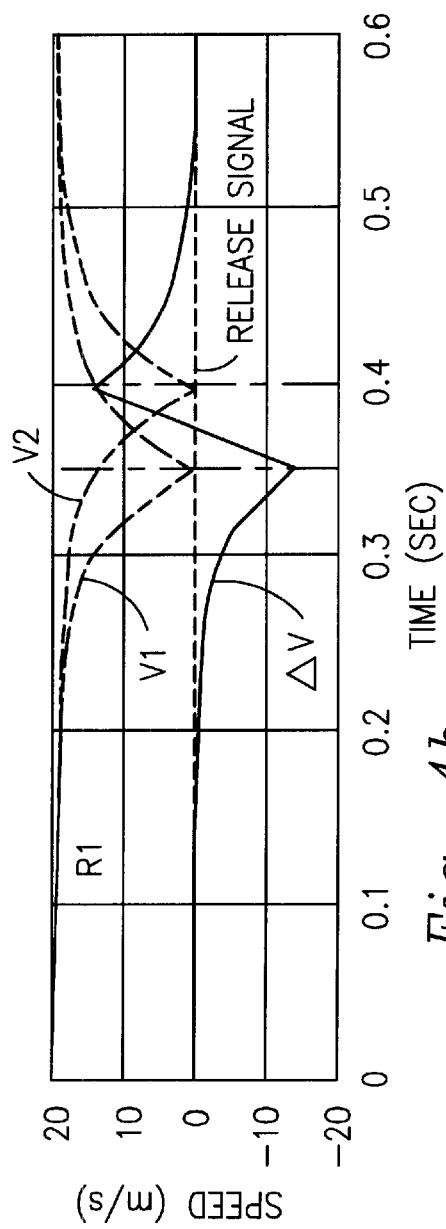
Figure 5A:
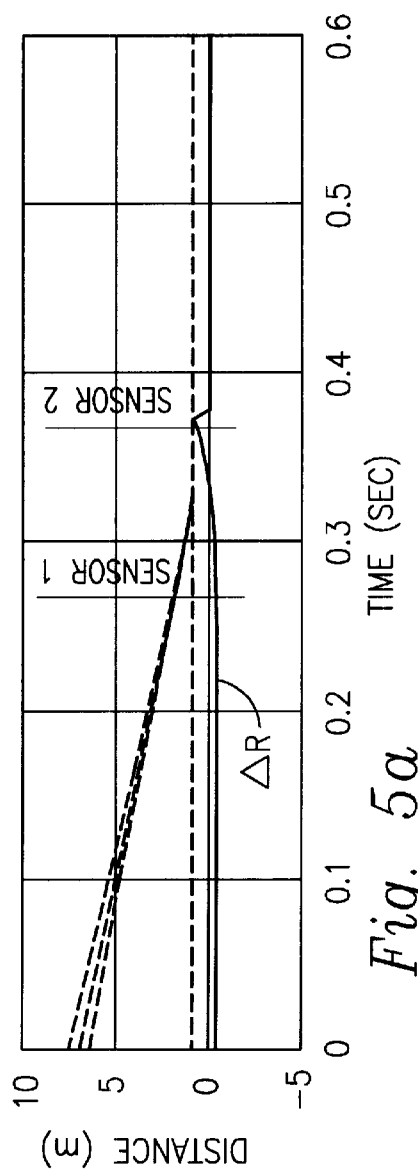
FIGS. 5a and 5b show the sensor signal and the actuation signal for an impact situation.
Figure 5B:
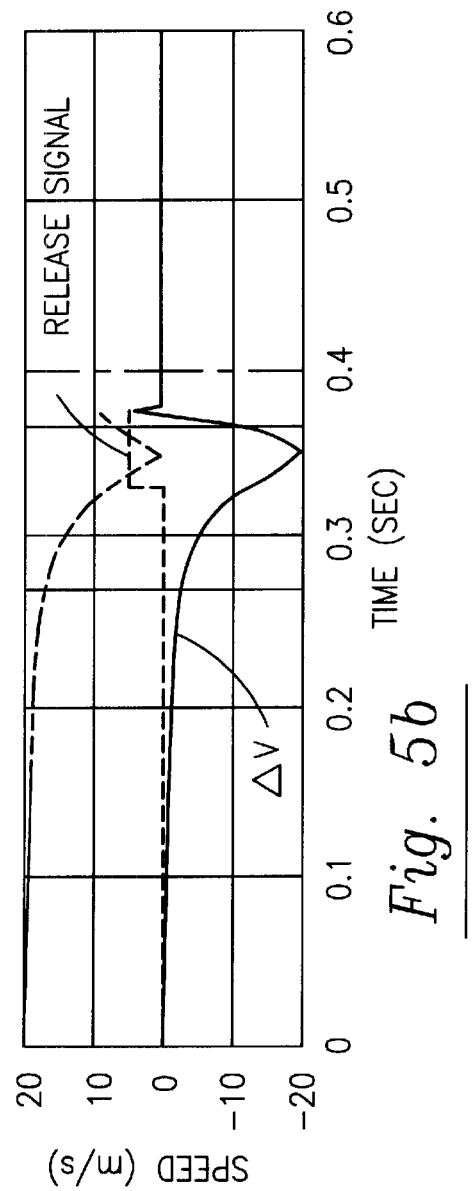

If one equips the radar with realizable or realistic actuation values, for example ΔR=0.1 m and ΔV=1 m/s, then the timeline of the actuation signal obtained on the basis of the differential formation of the sizes Rn and Vn for an example of an occurrence of a parallel passing is shown in FIG. 4 and for a n example of a collision situation is shown in FIG. 5.

What is claimed is:

1. A sensor system for the triggering of a side airbag in a vehicle having at least one door and at least one vehicle side, said sensor system comprised of;
   (a) at least first and second millimeter wave emitting sensors (1) and (2) spaced at least two decimeters apart and integrated in said at least one door or said at least one vehicle side for respectively generating measurement signals by a multi-frequency modulation process;
   (b) signal processing means (3) for receiving said measurement signals, resolving a collision object (5) into individual echo centers (6) using radar signals, and determining the distance value (Rn) and the transverse velocity (Vq) of said echo centers relative to the at least one door, and
   (c) a situation analysis module (4) downstream of said signal processing means, for differentiating the two sensor measurement signals, to
      (1) Classify said collision object according to geometric characteristics and
      (2) determine whether a parallel passage or an impact situation exists,
   wherein from an analytical correlation of the determined transverse velocity (Vq), the classified collision object and the determined impact situation in the situation analysis module (4), an actuation impulse (Ai) for the actuation electronic of the airbag is generated in a threatening situation.

2. A sensor system according to claim 1, wherein the sensors (1 and 2) are 76-GHz-high frequency front end receivers.

3. A sensor system according to claim 1, wherein the multi-frequency modulation process is a "two-frequency process" with a separation of 50 MHz between the two frequencies.

4. A sensor system for the triggering of a side airbag in a vehicle having at least one door and at least one vehicle side, said sensor system comprised of:
   (a) at least first and second millimeter wave emitting sensors (1) and (2) spaced at least two decimeters apart and integrated in said at least one door or said at least one vehicle side for respectively generating measurement signals by a multi-frequency modulation process;
   (b) signal processing means (3) for:
      receiving said measurement signals,
      resolving a collision object (5) into individual echo centers (6) using radar signals,
      tracking said echo centers Rn and Vn with each of the respective sensors (1) and (2) over time,
      determining the distance value (Rn) and the transverse velocity (Vq) of said echo centers relative to the at least one door,
      selecting from the various velocities (Vn) of the echo centers the line of maximum Doppler frequency (max detected Vr) as the relative speed (Vr) of the collision object (5),
      calculating, from the direction and relative speed (Vr) of the collision object, the velocity (Vq) of the collision object perpendicular to said at least one door,
      extracting collision object characteristics from FFT-data over multiple evaluation cycles for the task of object recognition, and using a recognition algorithm to carry out object size or shape classification on the basis of the extracted collision object characteristics,
   (c) a situation analysis module (4) downstream of said signal processing means, wherein:
      the classified object size or shape, the calculated perpendicular velocity (Vq), and the tracks of the Rn and Vn of the echo centers are used by said situation analysis module to determine danger of impact of the collision object on the at least one door or said at least one vehicle side, and
      when
         (i) an appropriate size or shape of the collision object (5) is classified,
         (ii) the differences between the velocity values Vn and the distance values Rn from the respective sensors (1) and (2) are indicative of an impact situation, and
         (iii) the perpendicular velocity (Vq) exceeds a threshold value,
      an actuation impulse (Ai) is triggered for the actuation electronic of the airbag.

* * * * *